(12) United States Patent
Niemann

(10) Patent No.: US 10,889,151 B2
(45) Date of Patent: Jan. 12, 2021

(54) METHOD FOR CAPTURING THE STATE OF WEAR OF AT LEAST ONE VEHICLE TYRE

(71) Applicant: HELLA GmbH & Co. KGaA, Lippstadt (DE)

(72) Inventor: Thomas Niemann, Delmenhorst (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 161 days.

(21) Appl. No.: 16/186,127

(22) Filed: Nov. 9, 2018

(65) Prior Publication Data

US 2019/0143758 A1 May 16, 2019

(30) Foreign Application Priority Data

Nov. 10, 2017 (DE) .......................... 10 2017 126 420

(51) Int. Cl.
*B60C 11/24* (2006.01)
*G01M 17/02* (2006.01)

(52) U.S. Cl.
CPC ......... *B60C 11/246* (2013.01); *G01M 17/025* (2013.01)

(58) Field of Classification Search
USPC ................................................ 73/146–146.8
See application file for complete search history.

(56) References Cited

U.S. PATENT DOCUMENTS

| 2016/0114632 | A1* | 4/2016 | Hellerud | B60C 11/246 280/63 |
| 2019/0145924 | A1* | 5/2019 | Kanning | G01N 27/223 324/664 |
| 2020/0062042 | A1* | 2/2020 | Pryce | G01B 11/026 |
| 2020/0062933 | A1* | 2/2020 | Mazzocchia | C08L 7/00 |
| 2020/0130420 | A1* | 4/2020 | Puranik | B60C 23/06 |
| 2020/0158692 | A1* | 5/2020 | Ledoux | G01N 29/14 |

FOREIGN PATENT DOCUMENTS

| DE | 19523917 A1 | 1/1997 |
| DE | 10107862 A1 | 9/2002 |

* cited by examiner

*Primary Examiner* — Andre J Allen
(74) *Attorney, Agent, or Firm* — Muncy, Geissler, Olds & Lowe, P.C.

(57) ABSTRACT

In a method for capturing the state of wear of at least one vehicle tyre on a vehicle wherein at least one measurement signal is captured with a least one sensor device of the vehicle it is provided as essential to the invention that a quantity of water striking at least one section of the vehicle is determined by means of at least one precipitation detection device, a measurement value of the water thrown up from the road by at least one tyre to be monitored is captured by means of at least one additional sensor device, and that at least one standard value for the measurement value of the water thrown up measured with the additional sensor device (7) is calculated from the quantity of water determined with the aid of the precipitation detection device. It is further provided as essential to the invention that the measured measurement value is compared with the calculated standard value, and a conclusion is drawn about the state of wear of at least one vehicle tyre from the comparison of the measured measurement value with the calculated standard value.

16 Claims, 1 Drawing Sheet

METHOD FOR CAPTURING THE STATE OF WEAR OF AT LEAST ONE VEHICLE TYRE

BACKGROUND OF THE INVENTION

Field of the Invention

The invention relates to a method for capturing the state of wear of at least one tyre of a vehicle, wherein at least one measurement signal is captured with at least one sensor device of the vehicle. The invention further relates to an apparatus for performing the method.

Description of Related Art

Capturing the state of wear of a vehicle tyre on a vehicle is indispensable for the safe operation of a vehicle. One commonly used method for checking tyre wear is to measure the tread depth with a tread depth gauge. Such a test is typically only carried out infrequently and at irregular intervals. Measurement with a tread depth gauge does not make it possible to monitor the state of wear continuously, because a tread depth gauge cannot be used while the vehicle is being driven. Visual inspection of the condition of the tyre by the vehicle owner for example is also inaccurate and labour-intensive. Accordingly, continuous monitoring of the state of wear with a sensor system arranged inside the vehicle is useful.

BRIEF SUMMARY OF THE INVENTION

The object underlying the invention is to suggest a method for capturing the state of wear of a vehicle tyre in which it becomes possible to monitor the state of wear of the vehicle tyre continuously.
The object is solved with a method having the features of Claim 1 and with a device having the features of Claim 14. Further developments and advantageous equipment designs are described in the subordinate claims.

In a method for capturing the state of wear of at least one vehicle tyre on a vehicle, wherein at least one measurement signal is captured with at least one sensor device of the vehicle, it is provided as essential to the invention that a quantity of water striking at least a section of the vehicle is determined by means of at least one precipitation detection device, that a measurement value for the water thrown up from the road by at least one tyre that is to be monitored is captured with at least one additional sensor device, that at least one standard value for the measurement value of the water thrown up that is measured by the additional sensor device is calculated from the quantity of water determined by means of the precipitation detection device, that the measured measurement value is compared with the calculated standard value and that a conclusion is drawn about the state of wear of at least one vehicle tyre from the comparison of the measured measurement value with the calculated standard value.

A precipitation detection device may be for example a rain sensor, a rain-light sensor or similar. The precipitation detection device may be arranged for example on the front windscreen of the vehicle and designed to capture a degree of wetness on the windscreen. For this purpose, a measuring section may be provided in the precipitation detection device, for example, in which a light beam is coupled into the windscreen, the light beam is totally reflected between the interior surface and exterior surface of the windscreen, and is coupled out of the windscreen again at the end of the measuring section. The greater the degree of wetness on the windscreen, the more light is coupled out of the windscreen instead of being totally reflected. By comparing the light beam that is coupled in and coupled out, it is thus possible to draw a conclusion regarding the state of wetness of the windscreen. In particular, it is possible to determine a quantity of water striking a section of the vehicle, particularly the windscreen, by means of the precipitation detection device. In rainy conditions, not only does the vehicle become wet, but rain also falls on the road on which the vehicle is travelling. The precipitation is thrown up by the tyres, for example. In this context, one of the factors affecting the quantity of water thrown up from the road by the tyres is the tread depth of the vehicle tyres. The deeper the tread pattern of the vehicle tyre, the more water the vehicle tyre is able to throw up from the road. The water thrown up from the road may be projected towards a section of the outer shell of the vehicle, for example, particularly towards the inside of the wheel arch shells. The impacting water may be captured by sensor devices which may be arranged in the region of the striking water, that is to say particularly on the insides of the wheel arch shells. In this context, for example, a sensor device may be embodied as a sound sensor, particularly as a structure-borne sound sensor. The water striking the outer shell of the vehicle causes mechanical pulses to be transmitted to the outer shell of the vehicle, and these are propagated in the form of structure-borne sound signals. The structure-borne sound signal may be captured by a structure-borne sound sensor and the captured structure-borne sound signals may be evaluated accordingly. For example, the amplitude of the structure-borne sound signal may serve as an indicator of the quantity of water thrown up. A sensor device may also be designed as a capacitance sensor, wherein for example the capacitance of the striking spray water may be measured between two electrodes. The greater the quantity of water that is splashed between the two electrodes of the electrode pair, the greater the capacitance is. Thus, with the capacitance measurements it is also possible to draw a conclusion regarding the quantity of water thrown up from the road by the vehicle tyres. The quantity of water measured with the precipitation detection device may be used to calculate a standard value for the measurement values which are captured with the additional sensor devices, particularly the sensor devices arranged in the wheel arches. Accordingly, for example, a certain structure-borne sound signal amplitude and a certain quantity of water thrown up by the vehicle tyres may be expected for a certain quantity of water determined with the precipitation detection device. In the same way, a certain capacitance of the spray water thrown up is to be expected when the water thrown up is determined by means of a capacitance sensor for a certain quantity of water measured with the precipitation detection device. The standard value for the respective quantity of water calculated with the precipitation detection device and the measurement value determined with the additional sensor devices are compared. A conclusion regarding the state of wear of the respective vehicle tyre may be drawn from the comparison of the standard value with the measurement value. For example, if the measured capacitance is lower and the signal amplitude of the structure-borne sound smaller than the expected standard values for these variables, this indicates that a smaller quantity of water than the expected quantity of water was thrown up by the vehicle tyre, which in turn suggests a smaller tread depth and accordingly wear of the vehicle tyre. When a critical degree of wear is found, for example when the value falls below a threshold value, a warning signal or warning message may be output to the vehicle driver.

In a further development of the invention, the measurement values detected with the at least one additional sensor device for capturing the water that is thrown up are sound signals, in particular structure-borne sound signals, which are generated when the thrown up water strikes at least one section of the outer shell of the vehicle, particularly the wheel arch shell. The additional sensor devices for capturing the spray water thrown up by the tyres may be structure-borne sound sensors. The structure-borne sound signals which are generated for example on the outer shell, particularly by spray water thrown up from a wet road by the vehicle tyres and striking the inner shell of the wheel arch may be captured by the structure-borne sound sensors. A conclusion may be drawn for example about the quantity of water striking the sensor region from the from the structure-borne sound signals. In this context, the quantity of water thrown up may vary depending on the state of wear of the vehicle tyres, particularly the tread depth.

In a further development of the invention, the measurement values detected with the at least one additional sensor device for capturing the water that is thrown up are capacitance signals, which are captured when the water thrown up strikes at least one section of the outer shell of the vehicle, particularly the wheel arch shell. The water thrown up by the vehicle tyres may be captured for example by capacitance sensors, particularly by capacitance sensors arranged on wheel arch shells. The capacitance sensors may particularly be electrode pairs. When thrown up spray water strikes the electrodes, the capacitance may be used to determine the presence of water on the sides of the wheel arch shells facing the tyres, and in particular the quantity of water. A conclusion may be drawn about the state of wear of the vehicle tyre by comparing the measured capacitance values with a standard value calculated theoretically from the quantity of water determined by means of the precipitation detection device.

In a further development of the method, a quantity of water striking the windscreen is captured by means of the precipitation detection device. The precipitation detection device may be for example a rain sensor which is arranged on the windscreen of the vehicle. With the arrangement on the windscreen it is possible to determine the quantity of water striking the windscreen.

In a further development of the method, the quantity of water thrown up by a vehicle tyre and striking a region of the outer shell of the vehicle is determined from the measurement values of the additional sensor devices. The quantity of water sprayed onto the sensor regions by the tyres may be determined by the sensor devices that may be arranged for example on the inner sides of the wheel arch shells, that is to say the sides facing the tyres, using for example the capacitance or the structure-borne sound signal measurements. An expected value may be calculated as a standard value for the measurement values of the additional sensor devices using the quantity of water measured with a precipitation detection device. If there is a difference between the standard value and the measured measurement values, it may be concluded that a state of tyre wear exists.

In a further development of the method, the vehicle's travelling speed is included in the calculation of a standard value for the quantity of water that a vehicle tyre may be expected to throw up. The quantity of spray water thrown up by the tyres may be dependent on the vehicle's travelling speed. When the vehicle is travelling at high speed, the tyres rotate faster, so that the water picked up from the road undergoes increased acceleration and strikes the outer shell of the vehicle, for example the wall of the wheel arch shell, with more kinetic energy. Consequently, the standard value determined from the measurement by the precipitation detection device may then be compared with the measurement value from the additional sensor devices for a defined vehicle speed, for example, so that compensation can be made for the effects of the vehicle's travelling speed.

In a further development of the method, a standard value for the quantity of water thrown up is recorded by the additional sensor devices for new tyres fitted on the vehicle and the standard value is captured as a function of the quantity of water determined by the precipitation detection device. With new tyres fitted on the vehicle, a standard value for the quantity of water thrown up by the vehicle tyres may be recorded by means of the additional sensor devices for a given quantity of water measured with the precipitation detection device. For example, a measurement value of the capacitance and/or a structure-borne sound signal generated by the spray water thrown up by the tyres may be recorded as standard values for a known quantity of water measured by the precipitation detection device. The standard values may be stored for example in electronic form in an evaluator or a similar computing unit. In this way, the standard values serve as reference values, which may represent a reference state of the tyres. The measurement results of subsequent measurements of thrown up water by the sensor devices may be compared with the standard values for a known quantity of rain determined by the precipitation detection device. Differences between the measurement values determined by the additional sensor devices and the standard values may indicate that less water is being thrown up due to tyre wear.

In a further development of the method, a conclusion may be drawn about increasing tyre wear if the measured quantity of water thrown up falls below the standard values for the quantity of water thrown up. The standard value, which may be recorded for example with brand new tyres newly fitted on the vehicle, may represent an ideal value for the quantity of water thrown up. If the quantity of thrown up water falls below this ideal quantity of thrown up water, that is to say if it falls below the predetermined standard values, a conclusion may be drawn regarding tyre wear, for example due to diminished tread depth.

In a further development of the method, the standard value is stored and is used as the standard value when tyres are changed. Particularly in the case of vehicles on which winter tyres are replaced with summer tyres, standard values may be recorded and stored for the various tyre types. When the tyre type on the vehicle is changed, to summer tyres, for example, the corresponding stored standard value may be used as the reference parameter.

In a further development of the method, a function graph of the measurement values of the thrown up water may be calculated against the quantity of water captured by the precipitation detection device, and the state of wear of the tyre determined from the function graph. A function graph for the measurement values of the thrown up water, particularly the structure-borne sound values or the capacitance measurement values recorded with the additional sensor devices, may be calculated depending on the quantity of water determined with the aid of the precipitation detection device. In this way a certain measurement value of the water thrown up by the tyres is returned for a certain quantity of water recorded with the precipitation detection device. The quantity of water thrown up may be dependent on the degree of wetness of the road, that is to say the quantity of water on the road, and on the tread depth of the vehicle tyres. Separate function graphs may be recorded for various tread depths of the vehicle tyres. A conclusion regarding the state of wear of the vehicle tyres, particularly the tread depth may by drawn on the basis of the function graphs plotted from known measurement values of thrown up water from the additional sensor devices and the quantity of water determined with the precipitation detection device. Conversely, a conclusion may be drawn about the quantity of water present and striking the vehicle from known measurement values from the additional sensor devices, for example from capacitance values or structure-borne sound signal values for the thrown up water, and known values for the state of wear, particularly the tread depth of the vehicle tyres. Since the tread depth of the vehicle tyres does not usually vary rapidly and arbitrarily, a tread depth determined with the aid of the function graph may be established as a comparison value. Expected measurement values for the precipitation detection device may be calculated from the corresponding function graphs with the aid of the measurement values for thrown up water determined using the additional sensor devices. In this way, a comparison may be made between the water quantity actually measured with the precipitation detection device and the expected quantity of water calculated with the aid the additional sensor devices. By comparing the expected quantity of water and the measured quantity of water, it is possible to calibrate the precipitation detection device and to verify the quantity of water measured with the precipitation detection device.

In a further development of the method, the quantity of water determined by the precipitation detection device is indicated as a unit of volume and a unit of time per unit. To ensure that the quantity of water determined by the precipitation detection device can be easily evaluated and compared, the quantity of water may be specified in a unit of volume per unit of time and a unit of area. For example, the quantity of water may be indicated in litres per square metre and hour.

In a further development of the method, the quantity of water striking the front windscreen is determined as a function of the position of a windscreen wipers sweeping over the windscreen. In conditions of precipitation, the windscreen wipers on a vehicle sweep over the front window, that is to say the vehicle's windscreen, and displace the precipitation that falls into the region over which the windscreen wiper passes in front of the wiper blades. The quantity of water that is displaced in front of a wiper blade may be determined by the precipitation detection device as the precipitation passes over the precipitation detection device, for example the rain sensor. For this purpose, the measurement by the precipitation detection device may be adapted to the wiping motion cycle of the windscreen wipers. A more accurate determination of the quantity of water falling onto the surface of the vehicle may be arrived at by measuring the quantity of water displaced in front of the wiper blade.

In a further development of the method, the quantity of water displaced by a windscreen wiper may be determined at least one position over which the windscreen wiper passes. By capturing the quantity of water displaced by a windscreen wiper at a position, which in particular is located in front of the region over which the windscreen wiper is about to pass, it is possible to arrive at a more accurate determination of the precipitation conditions and thus of the quantity of water falling onto the vehicle.

A further aspect of the invention relates to an apparatus for capturing the state of wear or at least one vehicle tyre on a vehicle, in particular for carrying out the method according to the invention. In order to capture the state of wear of at least one vehicle tyre, the apparatus includes a precipitation detection device, particularly a rain sensor, to enable a quantity of water striking the windscreen of the vehicle to be determined. The apparatus further includes additional sensor devices, particularly structure-borne sound sensors or capacitance sensor, which are arranged in the area which is struck by spray water thrown up by the vehicle tyres. In particular, the sensor devices may be arranged in the region of the walls of the wheel arch shells. The precipitation detection device and the additional sensor devices may be connected for data transmission purposes, for example either by wire or via a wireless connection to an evaluator in which the recorded measurement data may be evaluated. An expected measurement value for the additional sensor devices may be determined on the basis of the quantity of water measured by the precipitation detection device. In order to determine tyre wear of the tyre on the vehicle, the measurement values actually measured by the sensor devices may be compared with the theoretically expected measurement values. A difference between the theoretically pre-calculated values and the measured values may indicate tyre wear, since for example less water is thrown up by the vehicle tyres as the depth of the tyre tread diminishes.

BRIEF DESCRIPTION OF THE DRAWINGS

In the following section, the invention will be explained further with reference to a preferred embodiment represented in the drawing. In detail, the individual schematic illustrations show in.

DETAILED DESCRIPTION

Figure 1:
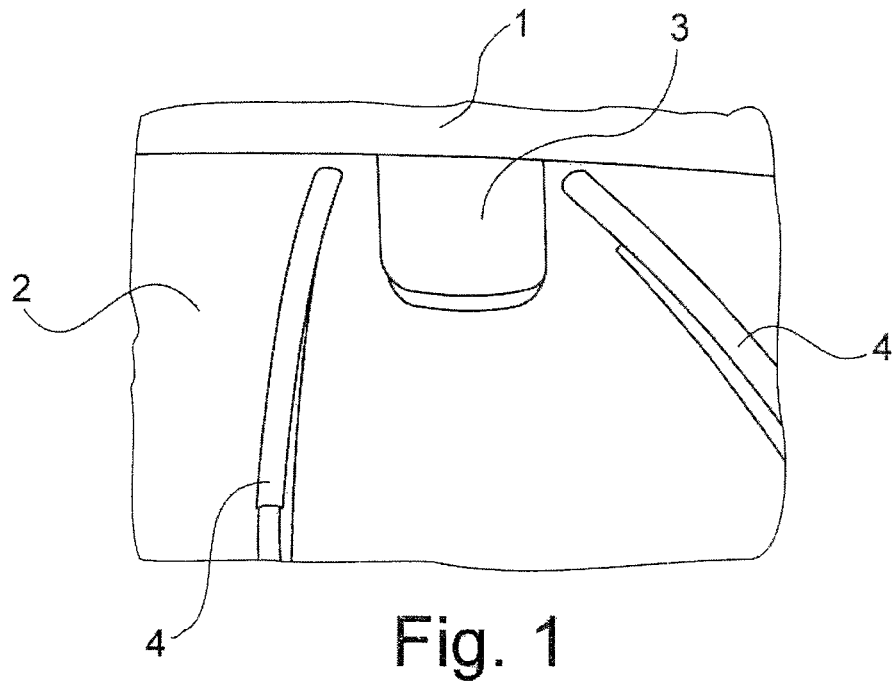
FIG. 1: a vehicle with a windscreen wiper and precipitation detection device.

FIG. 1 shows a vehicle 1 with a portion of a windscreen 2. A precipitation detection device 3 is arranged on the windscreen 2. The quantity of rain striking the windscreen 2 may be determined by the precipitation detection device 3. In particular, the quantity of rain displaced by a windscreen wiper 4 may be captured as the wiper passes over the position of the position of the precipitation detection device.

Figure 2:
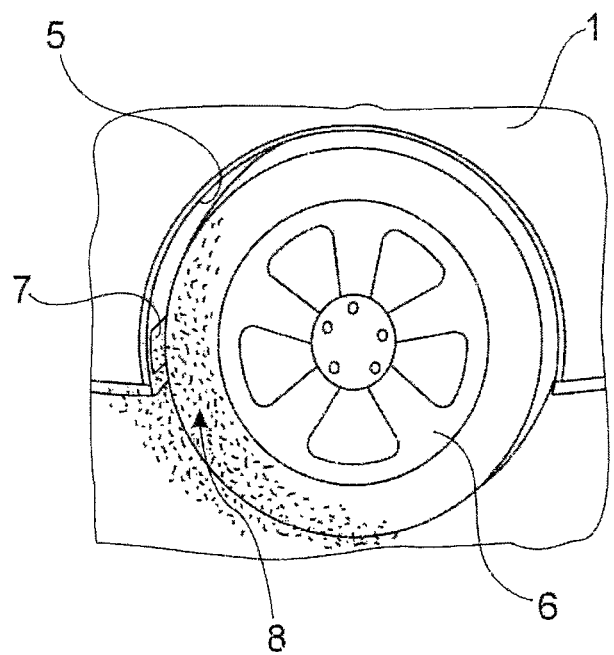
FIG. 2: an additional sensor device for capturing the spray water thrown up.

FIG. 2 shows a vehicle 1, in particular a wheel arch 5 of a vehicle 1. A sensor device 7 is arranged in the wheel arch 5, particularly on the side of the wheel arch 5 facing a vehicle tyre 6. The sensor device 7 may include for example a capacitance sensor and/or a structure-borne sound sensor. Moisture present on the road may be thrown up by the vehicle tyre 6 and projected against the wheel arches 5, particularly against the sensor device 7. The thrown up water 8 may be captured by the sensor device 7, for example via the structure-borne sound signals generated by the impact of the water or via the capacitance of the quantity of impacting water. The quantity of water 8 thrown up by the vehicle tyres 6 may vary for example according to the state of wear of vehicle tyre 6, particularly according to the tread depth of the vehicle tyre 6. Theoretically expected values for the measurement values of sensor device 7 may be calculated on the basis of the quantity of water captured with the precipitation detection device 3. A conclusion may be drawn about the state of wear of the vehicle tyre 6 by comparing the theoretically calculated value and the value for the thrown up water 8 measured by the sensor device 7. For example, a vehicle tyre 6 with diminished tread depth may throw up a smaller quantity of water from the road, so the measured measurement value is lower than the theoretically calculated value.

All of the features described in the preceding description and in the claims can be combined in any permutation with the features of the features of the independent claim. The disclosure of the invention is thus not limited to feature combinations that are described and/or claimed, but rather all combinations of features that are practicable within the scope of the invention as to be considered disclosed.

The invention claimed is:

1. A method for capturing the state of wear of at least one vehicle tire on a vehicle, the method comprising:
    capturing at least one measurement signal with at least one sensor device of the vehicle;
    determining a quantity of water striking at least one section of the vehicle by means of at least one precipitation detection device;
    capturing a measurement value of the water thrown up from the road by at least one tire to be monitored by means of at least one additional sensor device;
    calculating at least one standard value for the measurement value of the water thrown up measured with the additional sensor device from the quantity of water determined with the aid of the precipitation detection device; and
    comparing the measured measurement value with the calculated standard value,
    wherein a conclusion is drawn about the state of wear of at least one vehicle tire from the comparison of the measured measurement value with the calculated standard value.

2. The method according to claim 1, wherein the measurement values captured with the at least one additional sensor device for detecting the water thrown up are sound signals, which are generated when the water thrown up strikes at least one section of the outer shell of the vehicle.

3. The method according to claim 2, wherein the sound signals are structure-borne sound signals and the at least one section of the outer shell of the vehicle is the shell of the wheel arch.

4. The method according to claim 1, wherein the measurement values captured with the at least one additional sensor device for detecting the water thrown up are capacitance signals, which are captured when the water thrown up strikes at least one section of the outer shell of the vehicle.

5. The method according to claim 1, wherein a quantity of water striking a windscreen is captured by the precipitation detection device.

6. The method according to claim 5, wherein the quantity of water striking the windscreen is determined as a function of the position of a windscreen wiper sweeping over the windscreen.

7. The method according claim 1, wherein the quantity of water thrown up by a vehicle tire and striking a region of the outer shell of the vehicle is determined from the measurement values of the additional sensor device.

8. The method according to claim 1, wherein the travelling speed of the vehicle is included in the calculation of a standard value for the water quantity of the quantity of water that is expected to be thrown up by a vehicle tire.

9. The method according to claim 1, wherein a standard value for the quantity of water thrown up is recorded for vehicle tires newly fitted on the vehicle by the additional sensor device and the standard value is captured as a function of the quantity of water determined by the precipitation detection device.

10. The method according to claim 9, wherein when the measured value of the quantity of water thrown up falls below the standard value for the quantity of water thrown up a conclusion is drawn about increasing tire wear.

11. The method according to claim 1, wherein the standard value is stored and is used as a reference value when the tires are changed.

12. The method according to claim 1, wherein a function graph of the measurement values of the water thrown up is calculated as a function of the quantity of water captured by the precipitation detection device, and the state of wear of the tire is determined from the function graph.

13. The method according to claim 1, wherein the quantity of water determined by the precipitation detection device is indicated as a unit of volume per unit of time and per unit.

14. The method according to claim 1, wherein the quantity of water displaced by a windscreen wiper is determined in at least one position over which the windscreen wiper passes.

15. A device for capturing the state of wear of at least one vehicle tire on a vehicle, for the device configured to carrying out a method for capturing the state of wear of at least one vehicle tire on a vehicle, the method comprising:
    capturing at least one measurement signal with at least one sensor device of the vehicle;
    determining a quantity of water striking at least one section of the vehicle by means of at least one precipitation detection device;
    capturing a measurement value of the water thrown up from the road by at least one tire to be monitored by means of at least one additional sensor device;
    calculating at least one standard value for the measurement value of the water thrown up measured with the additional sensor device from the quantity of water determined with the aid of the precipitation detection device; and
    comparing the measured measurement value with the calculated standard value,
    wherein a conclusion is drawn about the state of wear of at least one vehicle tire from the comparison of the measured measurement value with the calculated standard value.

16. A device for capturing the state of wear of at least one vehicle tire on a vehicle, the device comprising:
    a sensor device of the vehicle configured to capture at least one measurement signal;
    a precipitation detection device configured to determine a quantity of water striking a section of the vehicle; and
    an additional sensor device configured to capture a measurement value of the water thrown up from the road by at least one tire to be monitored,
    wherein at least one standard value for the measurement value of the water thrown up measured with the additional sensor device is calculated from the quantity of water determined with the aid of the precipitation detection device,
    wherein the measured measurement value is compared with the calculated standard value, and
    wherein a conclusion is drawn about the state of wear of at least one vehicle tire from the comparison of the measured measurement value with the calculated standard value.

* * * * *